United States Patent
Lupke et al.

(10) Patent No.: US 7,976,753 B2
(45) Date of Patent: Jul. 12, 2011

(54) METHOD OF FORMING CORRUGATED PIPE WITH A PIPE SPIGOT SEAL SEAT

(76) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 1166 days.

(21) Appl. No.: 11/547,653

(22) PCT Filed: Apr. 8, 2005

(86) PCT No.: PCT/CA2005/000530
§ 371 (c)(1),
(2), (4) Date: Oct. 5, 2006

(87) PCT Pub. No.: WO2005/098302
PCT Pub. Date: Oct. 20, 2005

(65) Prior Publication Data
US 2010/0032046 A1 Feb. 11, 2010

(30) Foreign Application Priority Data
Apr. 8, 2004 (CA) .................................. 2464245

(51) Int. Cl.
| D01D 5/24 | (2006.01) |
| B28B 1/02 | (2006.01) |
| B29C 51/08 | (2006.01) |
| B29C 57/00 | (2006.01) |
| B29C 47/00 | (2006.01) |
| B29C 43/22 | (2006.01) |
| B29C 59/00 | (2006.01) |
| B23D 21/06 | (2006.01) |
| B26D 3/16 | (2006.01) |
| A01J 21/00 | (2006.01) |
| A01J 25/12 | (2006.01) |

(52) U.S. Cl. .................... 264/209.3; 264/310; 264/322; 264/323; 264/506; 264/508; 30/95; 425/392; 425/402

(58) Field of Classification Search ............. 264/209.3, 264/506; 425/402
See application file for complete search history.

(56) References Cited

U.S. PATENT DOCUMENTS

| 4,018,072 A * | 4/1977 | Davis ............................. 72/106 |
| 4,500,284 A * | 2/1985 | Lupke ........................ 425/511 |
| 5,342,570 A * | 8/1994 | Ledoux et al. ............... 264/566 |
| 6,578,882 B2 * | 6/2003 | Toliver ........................ 285/374 |
| 2005/0139569 A1* | 6/2005 | Larsen et al. .................. 215/44 |
| 2005/0140057 A1* | 6/2005 | Gerndt ....................... 264/284 |

FOREIGN PATENT DOCUMENTS

WO WO 0136167 A1 * 5/2001

* cited by examiner

Primary Examiner — Christina Johnson
Assistant Examiner — Benjamin Schiffman

(57) ABSTRACT

A piece of corrugated pipe cut from a longer length of pipe is provided with a pipe coupling part by subjecting one or more of the corrugation crests on the pipe to heat and pressure. This reshapes the one or more corrugations to form a seal receiving recessed spigot on the piece of pipe.

14 Claims, 6 Drawing Sheets

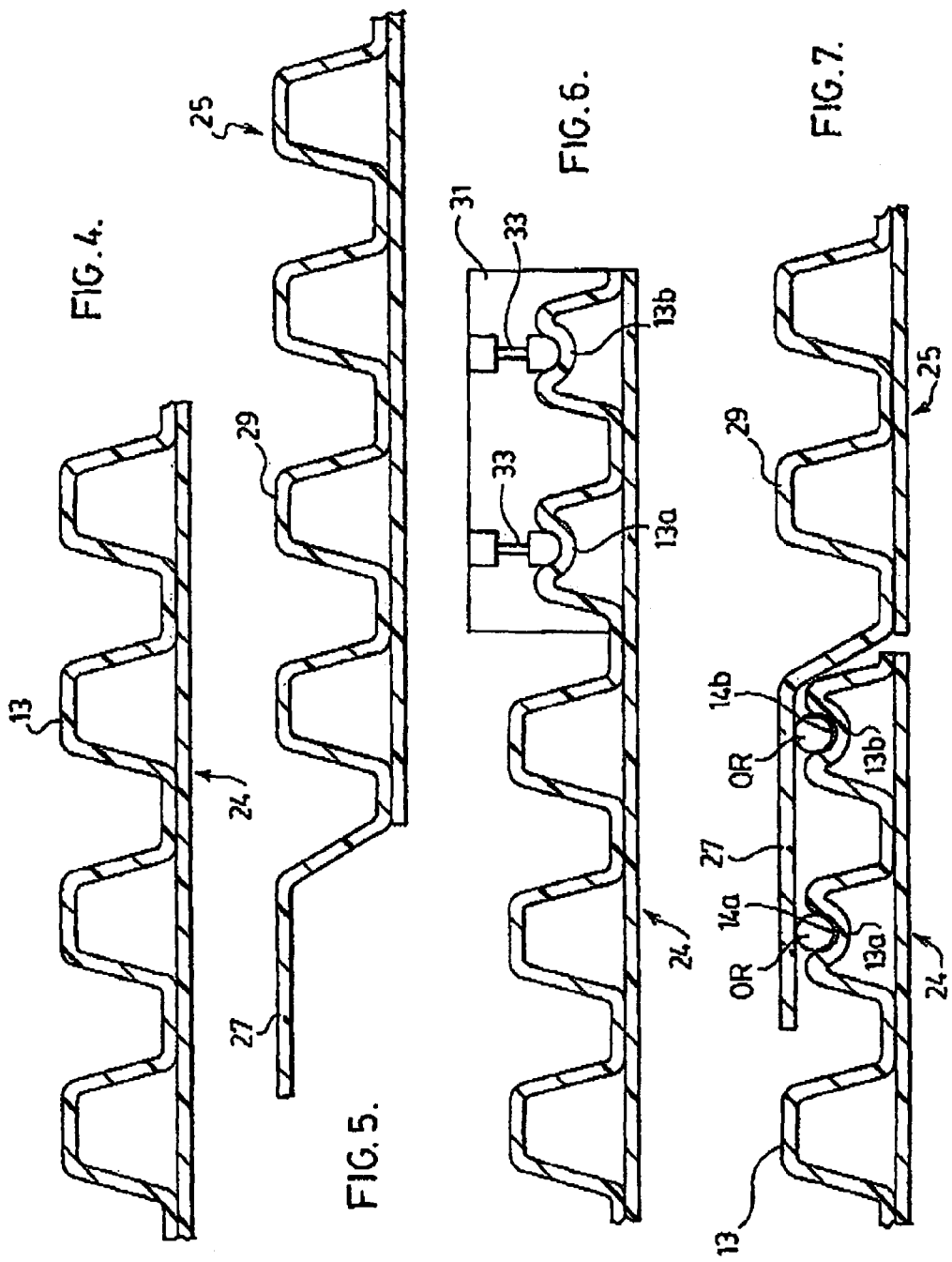

METHOD OF FORMING CORRUGATED PIPE WITH A PIPE SPIGOT SEAL SEAT

FIELD OF THE INVENTION

The present invention relates to a method of providing a spigot on a piece of corrugated pipe.

BACKGROUND OF THE INVENTION

Corma Inc. of Toronto, Ontario, Canada has developed a process of extruding a single length of plastic pipe which can then be cut into first and second pipe sections. The first pipe section includes an open ended bell and the second pipe section includes a spigot formed by corrugations on the second pipe section and insertable into the bell of the first pipe section to provide a coupling for the two pipe sections.

It is often the case that the second pipe section may be overly long for its intended use resulting a further severing along the length of the second pipe section to shorten it to its desired length. This results in a further pipe piece which includes neither a coupling spigot nor a coupling bell. As such, this further pipe piece cannot be connected to other pipe pieces and becomes expensive waste material.

SUMMARY OF THE PRESENT INVENTION

The present invention relates to a method in which a piece of plastic pipe having corrugations on its outer surface is converted to a seal receiving pipe spigot connectable to a piece of pipe having an open ended belled coupling part.

In this aspect of the invention at least one of the corrugation crests on the piece of plastic pipe is subjected to heat and pressure to reform the corrugation crest into a pipe seal receiving groove or seat.

According to another aspect of the invention the method relates to the producing of first, second and third pipe pieces of pipe from a single length of pipe in which the second pipe piece is coupleable with the first pipe piece and the third pipe piece is coupleable with a further pipe piece corresponding to the first pipe piece.

In this aspect of the invention the method comprises extruding a length of pipe with inner and outer pipe walls to form a first pipe region having a plurality of corrugations exteriorly of the first pipe region. Also formed is a second pipe region having first and second groups of corrugations exteriorly of the second pipe region. Further formed is closed bell between the first and second regions of the length of pipe.

The corrugation crests in the first pipe region, the bell and the corrugation crests in the second group of corrugations of the second pipe region are all consistent in height with one another and greater than the height of the shorter corrugation crests in the first group of corrugations in the second pipe region.

The length of pipe is severed at the bell to produce an open ended coupling part. The length of pipe is also severed between selected ones of the corrugations in the second group of corrugations of the second pipe region. This then produces first, second and third pipe pieces.

The shorter corrugation crests of the first group of corrugations are disposed or located on the second pipe piece and are insert able into the open ended coupling which is disposed or located on the first pipe piece.

Some of the corrugations of the second group of corrugations are also disposed on the second pipe piece with others of the corrugations of the second group of corrugations being disposed or located on the third pipe piece.

At least one of the crests of the corrugations on the third pipe piece is then collapsed to produce a reformed corrugation crest of a height consistent with that of the shorter corrugation crests of the first group of corrugations on the second pipe piece. The reformed corrugation crest provides a pipe seal seat and when fitted with a seal such as on an O-ring becomes a spigot on the third pipe piece. This spigot on the third pipe piece is also insertable into the open ended coupling part of the first pipe piece. As such, it will also couple with a further pipe piece having an open ended coupling part corresponding to the coupling part of the first pipe piece. As a result the third pipe piece becomes useable in forming another coupled pipe rather than being waste material.

BRIEF DESCRIPTION OF THE DRAWINGS

The above as well as other advantages and features of the present invention will be described in greater detail according to the preferred embodiments of the present invention in which;

FIG. 4 is a sectional view of the pipe wall of the part of the length of pipe which is removed from the length of pipe of FIG. 1 and not shown in FIG. 2 of the drawings;

FIG. 5 is a sectional view of pipe wall of a further pipe section having an opened ended coupling part the same as the open ended coupling part of the coupled pipe of FIG. 3 sections shown in FIG. 3 of the drawings;

FIG. 6 is a sectional view of the pipe wall of the pipe section shown in FIG. 4 during deformation of two of the corrugations in the pipe wall;

FIG. 7 is a sectional view showing the coupling of the pipe sections of FIGS. 5 and 6 together with one another;

DETAILED DESCRIPTION ACCORDING TO THE PREFERRED EMBODIMENTS OF THE PRESENT INVENTION IN WHICH

Figure 1:
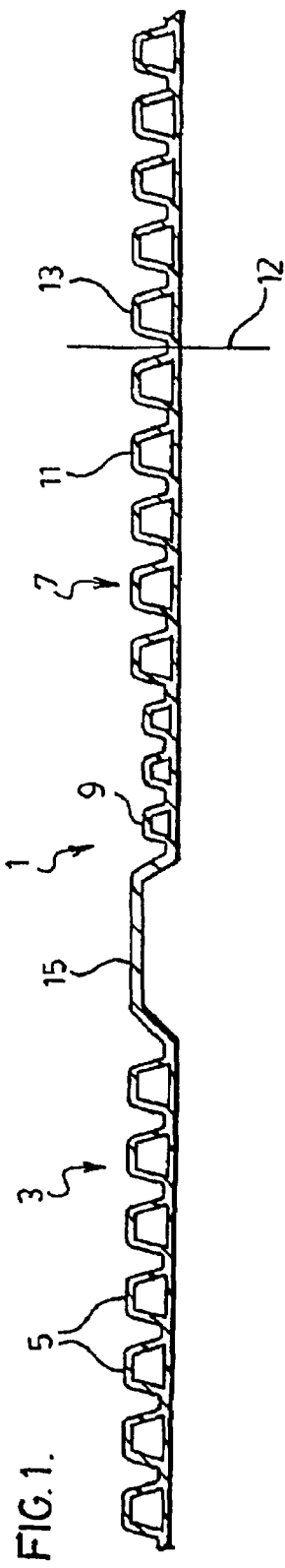
FIG. 1 is a sectional view through the wall of a length of double wall pipe extruded according to a preferred embodiment of the present invention.
Figure 2:
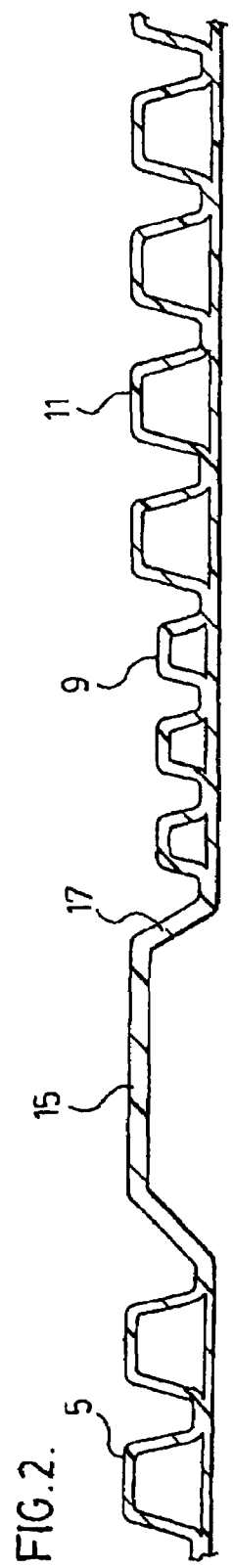
FIG. 2 is an enlarged sectional view showing the pipe wall only part of the length of pipe of FIG. 1 and with another part of the length of pipe being severed away according to a preferred method step of present invention.

FIG. 1 shows the wall construction of an extruded length of plastic pipe generally indicated at 1. This wall construction is formed by inner and outer layers of plastic to produce what is known in the industry as a double wall pipe with corrugations over a majority of the length of the pipe wall and including a belled region in the pipe wall.

More particularly, the length of pipe wall shown in FIG. 1 includes a first wall region generally indicated at 3 including corrugations with crests 5 exteriorly of the pipe wall and a second wall region generally indicated at 7 which includes corrugations with corrugation crests 9, 11 and 13 along the wall region 7. A closed ended bell region 15 is provided between the first pipe region 3 and second pipe region 7.

All of the corrugation crests 5, 11 and 13 are identical in size and shape to one another. Furthermore, they have a height consistent with the height of the bell 15 in the pipe wall. The corrugation crests 9 on the other hand are shorter in height than any one of the corrugation crests 5, 11 and 13 and also shorter in height than the bell 15.

As noted above, all of the above described components of the pipe wall are extruded in a single extrusion process.

Figure 3:
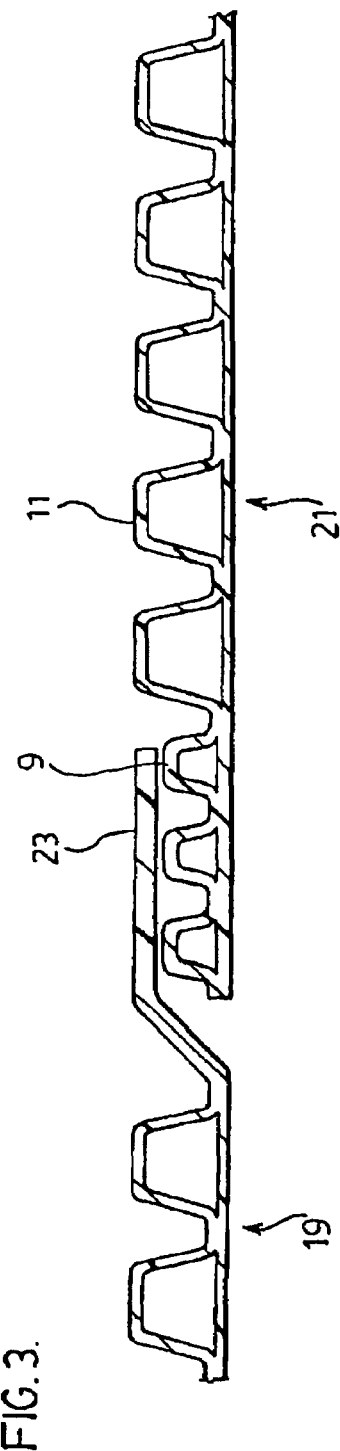
FIG. 3 is a sectional view of a coupled pipe wall made from wall parts shown in FIG. 2 of the drawings.

According to the present invention, the pipe wall is then severed into three pipe pieces including a first pipe piece generally indicated at 19 and a second pipe piece generally indicated at 21 shown in FIG. 3 of the drawings. A third pipe piece generally indicated at 23 shown in FIG. 4 of the drawings is also produced from the single length of pipe 1 shown in FIG. 1.

Pipe piece 23 is generally obtained as a result of cutting pipe piece 21 from a length which is overly long for a particular use down to the desired length. IN this case pipe piece 23 has, in the past been discarded as a piece of waste material.

The first and second pipe pieces 19 and 21 respectively are provided by cutting away part 17 of bell 15. This produces an open ended coupling part 23 on pipe piece 19. The first group of corrugations with crests 9 on the second pipe piece 21 are insertable into the open ended coupling part 23 of the first pipe piece 19 as shown in FIG. 3 to provide a coupling of the first and second pipe pieces.

In many instances and as earlier described, the second pipe region generally indicated at 7 in FIG. 1 of the drawings may be overly long for a desired length of pipe. Accordingly pipe region 7 is cut between selected ones of the second group of corrugations as indicated by the cut 12 in pipe region 7. This produces a separation between the second and third pipe pieces. The corrugation crests 11 remain on the second pipe piece 21 found in FIG. 3 of the drawings while the corrugation crests 13 are disposed or located on the third pipe piece 24 shown in FIG. 4 of the drawings.

In its FIG. 4 condition, pipe piece 24 does not include anything in the way of a spigot which ccould be coupled with either pipe piece 19 or any correspondingly shaped pipe piece such as pipe piece 25 shown in FIG. 5 of the drawings. This is because the height of the corrugation crests 13 on the pipe piece 24 shown in FIG. 4 of the drawings is the same as the height of the open ended coupling part 23 of pipe piece 19 and the open ended coupling part 27 of pipe piece 25 shown in FIG. 5 of the drawings. Accordingly, the corrugation crests 13 of the pipe piece 24 in the Figure condition will not insert into either of the open ended coupling parts 23 or 27 of the pipe pieces 19 and 25 respectively. As such, pipe piece 24 in its FIG. 4 state becomes a piece of pipe wastage.

In accordance with the present invention pipe piece 24 shown in FIG. 4 of the drawings is converted to a usable piece of pipe including a spigot which is insertable within the open ended coupling part 23 of pipe piece 19 or any other similar shaped open ended coupling part as for example, coupling part 27 on pipe piece 25 in FIG. 5 of the drawings. This is accomplished by reforming at least one of the corrugation crests 13 on pipe piece 24 so as to reshape the corrugation crest on to compress it to a height consistent with the corrugation crests 9 on pipe piece 21 shown in FIG. 3 of the drawings.

A particular corrugation crest reforming method is shown in FIG. 6 of the drawings in which two of the corrugation crests on pipe piece 24 are heated in a heating chamber 31 to soften the plastic material in the two crests. This occurs after the initial forming and cooling of the inner and outer walls of the plastic pipe of the entire length of pipe.

In FIG. 6, the two corrugation crests on the pipe piece 24 which are exposed to heat and mechanical pressure by pushers 33 are reshaped to provide reformed corrugation crests 13a and 13b. Following reforming these two corrugation crests are then allowed to once again cool to hold their reformed shape. In this reformed shape, each of the corrugation crests 13a and 13b has a center recess 14a and 14b respectively to receive an O-ring or as shown in FIG. 7 of the drawings. As is also shown in FIG. 7 of the drawings the reformed corrugation crests 13a and 13b provided with their O-rings are insertable into the open ended coupling part 27 of pipe piece 25 which as earlier described corresponds to the open ended coupling part of pipe piece 19. This then provides a sealed coupling between pipe pieces 24 and 25 in the same way as pipe piece 21 couples with pipe piece 19.

It should be noted that the two reformed corrugation crests 13a and 13b are formed from corrugation crests which are overall larger than the spigot forming corrugation crests 9 on pipe piece 21. Accordingly, each of the reformed corrugation crests 13a and 13b while being compressed during reforming to a height consistent to corrugation crests 9 is longer than each of the spigot forming corrugation crests 9. As such, fewer of the reformed corrugation crests may be required to provide the same length of spigot as that provided by the preformed corrugation crests 9.

As will be apparent from a review of FIGS. 5 through 7 of the drawings when the two pipe pieces 24 and 25 are coupled with one another there is produced an overall length of pipe having an outside diameter which is consistent over the length of that pipe. This is because the corrugation crests 13 on the pipe piece 24 are elevated to the same height as the open ended coupling part 27 and the corrugation crests 29 of the further pipe piece 25. Coupling part 27 and corrugation crests 29 of pipe piece 25 are also at the same height as the open ended coupling part 23 and the corrugation crests 5 on the first coupling piece 19 shown in FIG. 3 of the drawings.

It will now be seen from the above description how a piece of pipe which was previously nothing but pipe wastage becomes, in accordance with the present invention a useful piece of pipe connectable with other another piece of pipe.

In the above description, the reforming of the corrugation crest to provide a seal of a pipe spigot is provided on a length of pipe cut from between a longer piece of pipe having a bell coupling and a further spigot spaced from the bell coupling. It is to be appreciated that the concept of reforming a corrugation crest on the outer wall of a corrugated pipe piece is equally applicable to a continuous length of non-belled pipe. It is also applicable to an extremely short piece of corrugated pipe. This piece of corrugated pipe may also be built with its own bell coupling directly adjacent to the reformed corrugation. In this latter example the short length of pipe would act as both a male and female coupler for adjacent pieces of pipe separated by the combination male and female coupler. These adjacent pieces of pipe would not need to be built with any coupling parts whatsoever.

Regardless of the length or the overall shape of the piece of pipe the reforming of the corrugation is performed in a consistent manner. This manner or method of formation comprises extruding or even molding the piece of pipe from molten plastic which is then cooled to hold the shaping of the corrugation or corrugations in the outer wall of the pipe. After the shape of the outer corrugated wall has been set the corrugation crest or crests which are selected to provide sealing member seats as part of a pipe coupling, are subjected to both heat and pressure to reform the selected corrugation crest or crests. Under the application of the heat and pressure the reformed corrugation crest will include a recess or depression which provides a seat for a coupling seal such as an O-ring or the like.

FIGS. 8 through 14 of the drawings show various different method steps which can be used in reforming a corrugation crest in the manner described broadly above.

Figure 8:
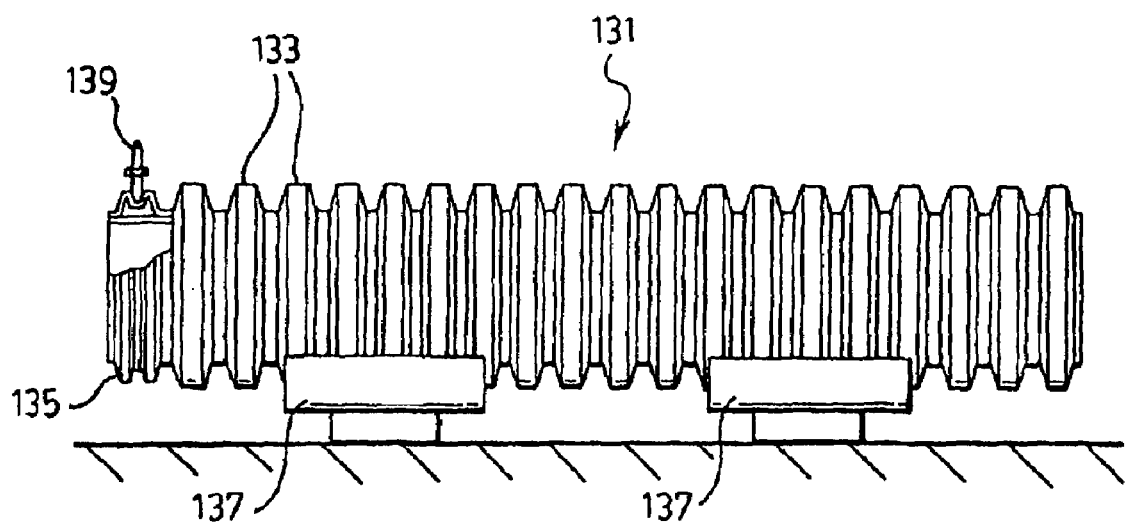
FIG. 8 is a side view of a piece of corrugated pipe with means for reforming the pipe to include a pipe spigot.

More specifically, FIG. 8 shows a piece of plastic pipe generally indicated at 131. This piece of plastic pipe is preferably formed in an extrusion process and is cut from a longer length of continuous pipe made in that extrusion process. Pipe piece 131 includes a plurality of corrugations which include corrugation crests 133 spaced from one another along the length of the piece of pipe. Preferably pipe piece 131 also includes a smooth inner wall adhered to the troughs in the corrugations between the crests 133.

In the FIG. 8 setup a selected corrugation crest 135 at the end of the pipe piece 131 is converted to a reformed corrugation crest. This reformed corrugation crest includes a center recess which provides a seat for a coupling sealing member such as an O-ring OR or the like.

The pipe piece 131 has been previously formed and is in a set or hardened condition. In this hardened condition a heated roller 139 is pushed downwardly onto corrugation crest 135. The heat of the roller causes corrugation crest 135 to soften back to a more plasticized condition in which the pressure applied by the roller is able to reform the shape of the corrugation crest.

Figure 9:
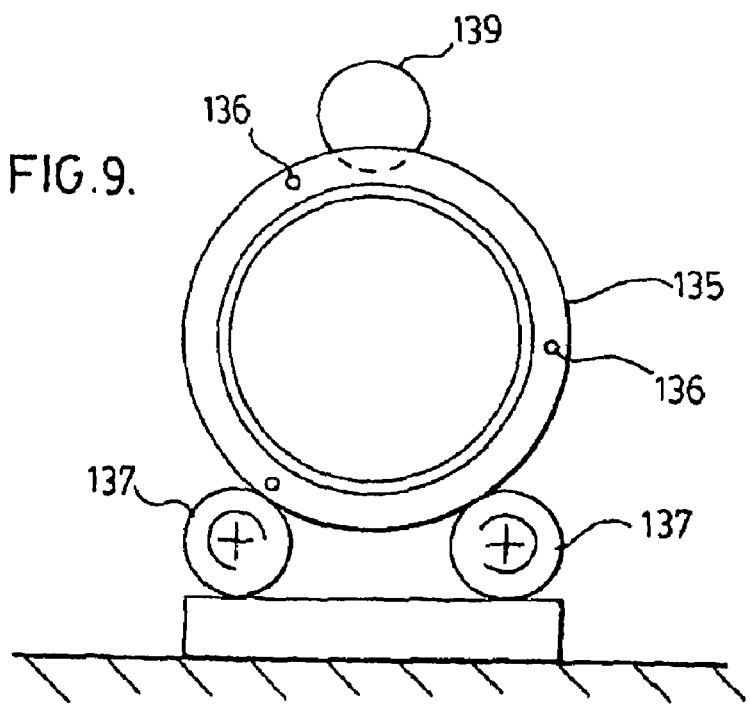
FIG. 9 is an end view of the piece of pipe shown in FIG. 8.

In the FIG. 8 arrangement pipe 131 as shown in FIG. 9 is supported on rotating dollies 137. These dollies are power driven to produce a rotation of pipe piece 131 on the dolly. The rotation of the pipe piece in engagement with roller 139 ensures that the roller itself is rotated and further ensures that the coupling seal is formed uniformly and continuously around the reformed corrugation crest.

Figure 10:
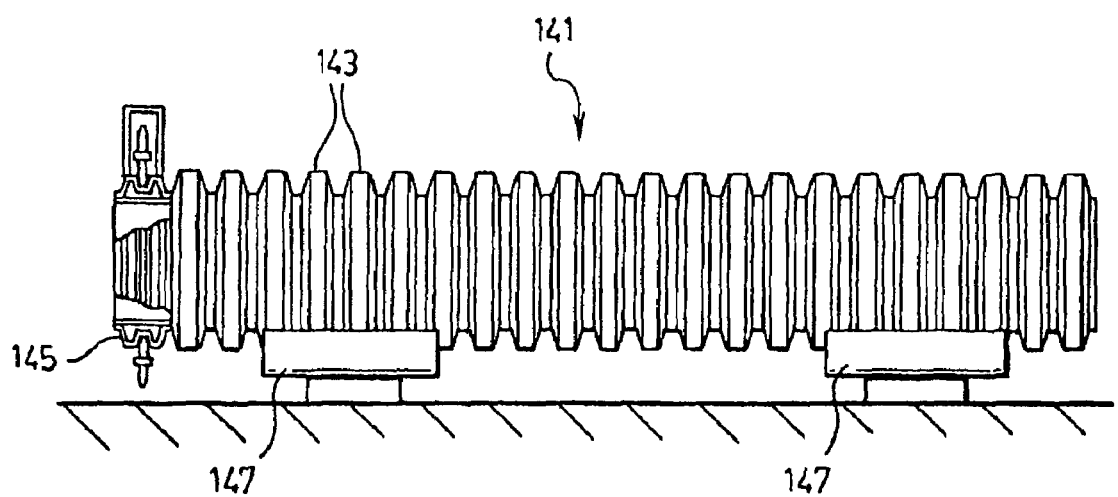
FIG. 10 is a side view of a piece of corrugated pipe being reformed with a spigot according to a further preferred embodiment of the invention.

In FIG. 10 a piece of set or hardened plastic pipe 141 includes a plurality of corrugation crests 143 along the length of the pipe. Once again, pipe piece 141 preferably includes a smooth wall adhered to the corrugation troughs.

A selected corrugation crest 145 is reformed to include a seal receiving recessed seat in the reformed corrugation. This is done by means of a plurality of pressure application rollers 149 spaced circumferentially from one another around the corrugation crest to be reformed. In this case the heat to which the reformed corrugation crest is subjected is applied by means of a nozzle 151 which directs a heated medium onto the crest. This is done directly in advance of one or more of the rollers 149. Each of the rollers 149 may additionally be a heated roller in which case the heat to which the reformed corrugation crest is subjected is applied by both the heated medium from nozzle 151 and the heat of the rollers themselves.

Figure 11:
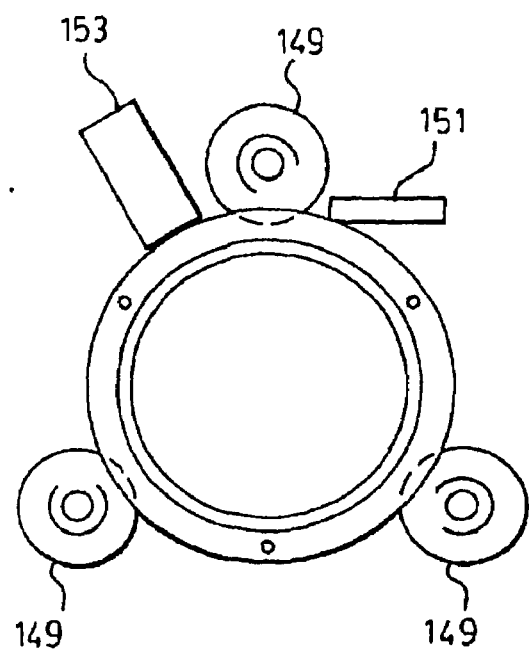
FIG. 11 is an end view of the piece of pipe shown in FIG. 10.

Also in the FIG. 11 arrangement a cooling member 153 is located to the back or rear side of roller 149. Again, more of these cooling members may be used at each one of the rollers 149.

Cooling member 153 can for example be a cooling nozzle which directs a cooling medium onto the reformed corrugation crest. It may also be a cooled mechanical member that rests directly against the surface of the recessed seat shaped in the reformed corrugation crest. Regardless, the purpose of the cooling member 153 is to immediately cool the plastic in the reformed corrugation crest after shaping the seat in the crest. This prevents any potential natural tendency of the plastic to return to the shape of the other corrugation crests 143 along the length of pipe piece 141.

Figure 12:
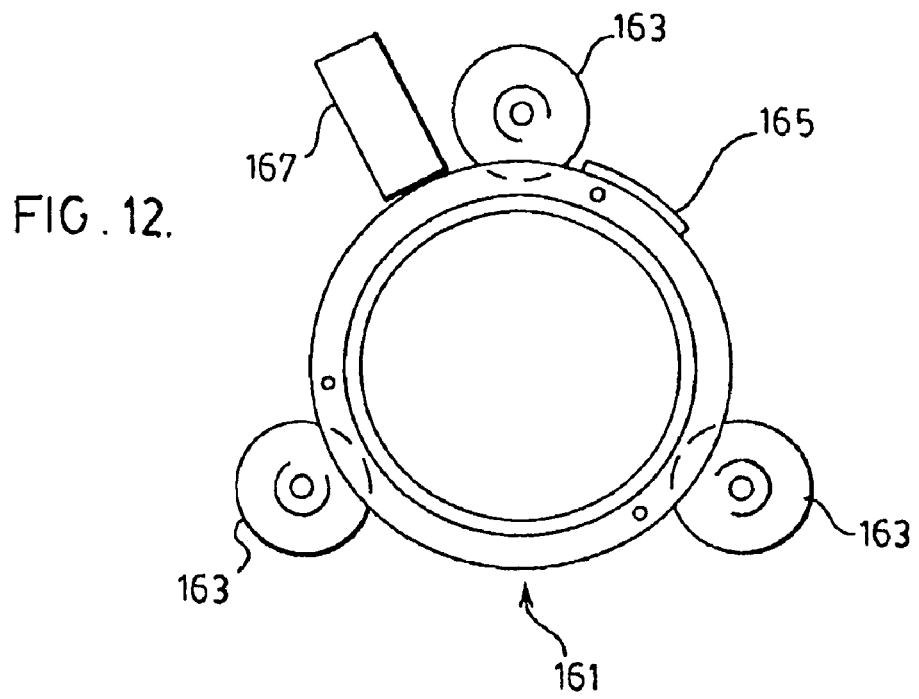
FIGS. 12 and 13 are end views of further pieces of pipe being reformed with spigots according to yet further preferred embodiments of the present invention.

FIG. 12 shows a further pipe piece 161 in which rollers 163 act on the pipe piece to reform one of the corrugation crests. A cooling member 167 and possibly further cooling members similar to 167 are also used in the FIG. 12 arrangement. Rollers 163 and cooling member 167 will operate in a manner the same as or similar to that described with respect to what is shown in FIG. 11 of the drawings. However, in the FIG. 12 setup rather than using a nozzle to direct the heated medium onto the reformed corrugation crest a heated mechanical member 165 such as a heated iron or the like is forced onto the corrugation crest directly in front of one or more of the rollers 163. This mechanical heater will soften the plastic material directly in front of the roller which may again be a heated roller. Softening of the plastic allows the roller to have its desired affect in producing a coupling member seal seat in the surface of the corrugation.

It should be noted that the amount of heat applied to the corrugation crest should only be sufficient to soften the plastic to the point that the sealing member seat can be pushed into the corrugation crest. The plastic should not be so softened that it returns to a completely molten state that will not hold a shape. Furthermore, the plastic should not be burned or otherwise treated to the point that after hardening it becomes brittle or scarred.

Figure 13:
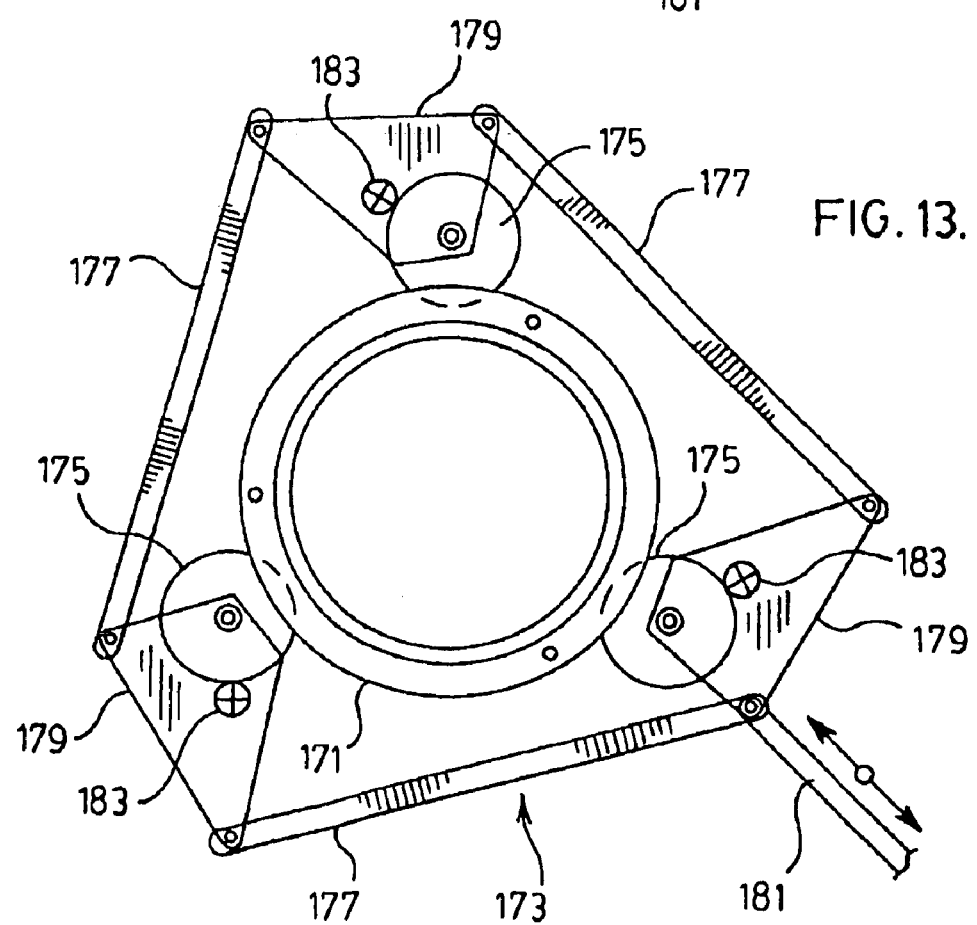

FIG. 13 of the drawings shows a piece of pipe 171 which is being subjected to a spigot seal reformation according to yet another embodiment of the invention. In this embodiment a linkage system generally indicated at 173 is used to control the positioning of reformation rollers 175. This linkage system includes a plurality of link members 177 which are connected to one another by link connectors 179. These link connectors also connect to the axles of the rollers 175. Rollers 175 are adjustable radially of the pipe piece 171.

A master link member 181 is used to adjust the positioning of link members 177. A single movement of the master link member produces a simultaneous and uniform movement of all of the rollers 175. The in/out positioning of the rollers relative to the pipe piece 171 determines the amount of pressure applied by rollers on the reformed corrugation. The link system also allows all of the rollers to be completely pulled away from the pipe piece in order to release the pipe piece from the system.

In this particular arrangement which is preferably used with a smaller diameter pipe, rollers 175 are rotated by means of power drives 183 in engagement with each of the rollers. For this smaller diameter pipe it may not be necessary to provide a separate pipe rotator in as much as the friction of the power driven rollers on the reformed corrugation crest may be sufficient to both reshape the corrugation crest and produce the rotation of the pipe within the system.

The use of the rotating dollies or other type of rotating supports for the piece of pipe is more preferable when working with a larger diameter heavier piece of pipe.

Figure 14:
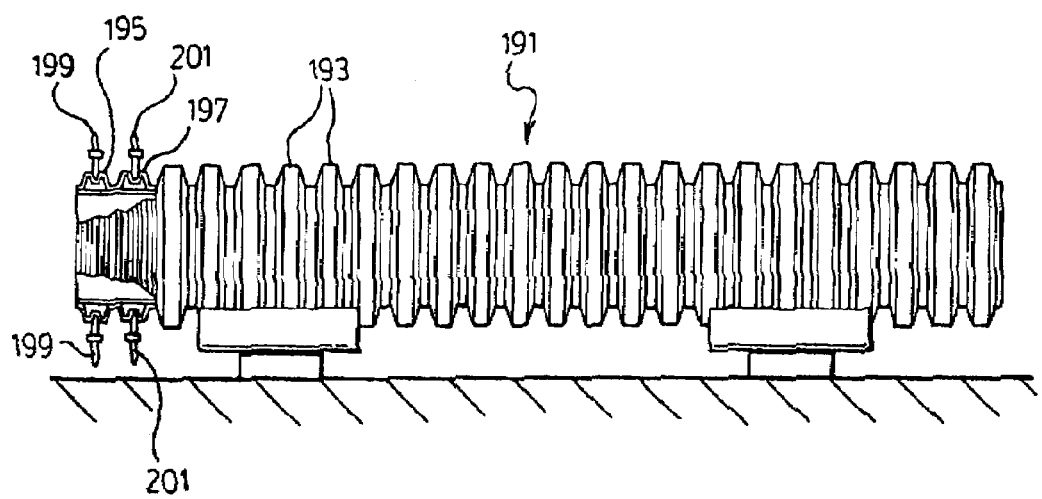
FIG. 14 is a side view of a piece of pipe being reformed to include a spigot according to another preferred embodiment of the present invention.

In each of the embodiments described above only an individual selected corrugation crest has been used to provide a pipe spigot seal seat. FIG. 14 of the drawings shows a further pipe piece 191 having corrugation crests 193 on its exterior surface. Two of these corrugation crests are reshaped to reformed corrugation crests 195 and 197. This is achieved by two sets of side by side spaced apart rollers 199 and 201.

As to be appreciated if desired more than the two corrugation crests shown in FIG. 14 can be reformed to provide a multiple seal seating spigot.

Figure 15:
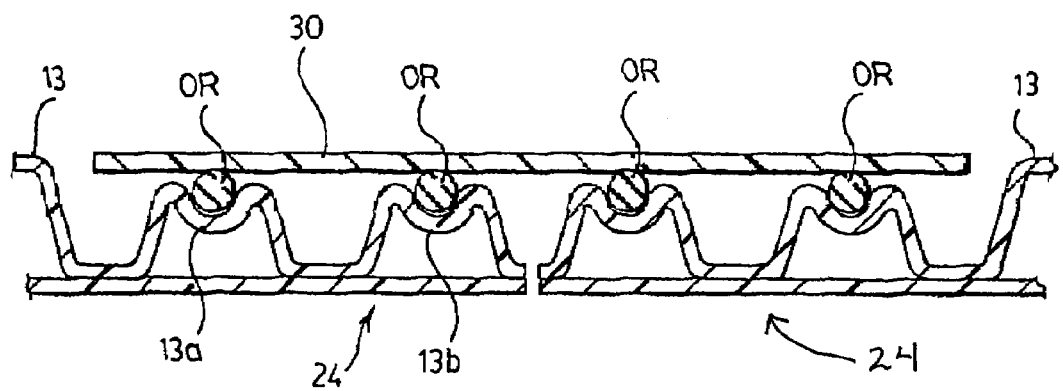
FIG. 15 is a side view of two pipe sections having reformed spigots and connected by a sleeve coupler.

FIG. 15 shows two reformed spigots 24 on two different pieces of pipe joined by a sleeve coupler 30. The coupler 30 is of an exterior diameter corresponding to the diameter of the original crests 13. As such, the coupler will lie within a trench for the pipe in the same manner as a length of the pipe. Each of the formed spigots 24 include two reformed corrugation crests 13a and 13b having a center recess for receiving the O-ring seal identified as OR.

With the arrangement as shown in FIG. 15, it is possible for a pipe manufacturer to decide to manufacture corrugated pipe of indefinite length and merely cut the pipe as necessary for shipping or warehousing. Each end of the cut pipe can have a spigot formed at opposite ends of the cut pipe by reforming two or more of the corrugation crests at the end of the pipe. With this arrangement the extrusion process is simplified as there is no requirement to provide mold blocks which will define a coupler and a spigot portion. Thus the embodiment of FIG. 15 has application with respect to simplifying the manufacturing process as the spigot formation is carried out after extrusion of the pipe and before or after cutting of the pipe to the appropriate length. This reforming step can also be left to the end user, but preferably is completed as a factory completed post extrusion step.

As can be appreciated, this reforming of the corrugation crests could be completed before or as part of a pipe cutting step. The reforming step could be completed in line as the pipe is being conveyed.

It would also be possible to manufacture the pipe with, for example, four reformed corrugation crests at a particular point in the length of the pipe. These reformed corrugation crests intermediate the length of the pipe, will not affect the laying of the pipe in a trench to any substantial extent as the full crest portions either side of these reformed sections will maintain the desired positioning. Such an arrangement will reduce the amount of wastage in the field and provide the end user with additional flexibility.

From the above, it can be appreciated that the reforming step can be carried out in the field as required by the application of heat and the reforming of the corrugation, however, the reforming step is not limited to this particular application.

A feature which is consistent with all of the reforming embodiments described above is the provision of air escape holes such as holes 136 shown in FIG. 9 of the drawings. When the pipe is formed with inner and outer walls some air is trapped between these two walls. The corrugation crest to be reformed is then provided with venting holes on its side wall surface. These venting holes allow the plastic material in the corrugation crest to be pushed inwardly without resistance from air trapped within the corrugation crest. This air escapes out through the venting holes 136.

The number of venting holes provided in the side surface of the corrugation crest is sufficient to allow a free movement of the air out of the corrugation crest. However, the number of holes should not be such that the wall of the corrugation crest is unduly weakened for its spigot forming function.

The venting holes may also be made directly in the outer surface of the corrugation crest. The holes would be formed before the application of the reforming pressure.

The venting holes generally would not be made in the inner wall of the pipe which should remain solid for use of the pipe in drainage applications. If however the pipe is not used for drainage the venting holes could be made in the inner pipe wall.

Although various preferred embodiments of the present invention have been described in detail, it will be appreciated by those skilled in the art that variations may be made without departing from the spirit of the invention or the scope of the appended claims.

The invention claimed is:

1. A method of forming a piece of plastic pipe with a seal receiving spigot, said method comprising shaping the piece of pipe from molten plastic with an outer wall having corrugation crests along the outer wall and a smooth inner wall adhered to said outer wall, setting the molten plastic to hold the shape of the piece of plastic pipe, and then subjecting at least a selected one of the corrugation crests to both heat and pressure to inwardly deform said at least one of the corrugation crests and produce a reformed corrugation crest of reduce height with a coupling seal recessed seat in said reformed corrugation crest.

2. A method as claimed in claim 1 including forming at least one air vent to vent air trapped between the selected one of the corrugation crests and the inner wall of the piece of pipe.

3. A method as claimed in claim 2 wherein the pressure is applied by a roller pressing into the selected one of the corrugation crests.

4. A method as claimed in claim 3 wherein the roller is heated.

5. A method as claimed in claim 4 wherein the heat is applied by a combination of the heated roller and a nozzle which directs a heated medium onto the selected one of the corrugations directly in advance of the roller.

6. A method as claimed in claim 4 wherein the heat is applied by a combination of the heated roller and a heated mechanical member pushed onto the selected one of the corrugations crests directly in advance of the heated roller.

7. A method as claimed in claim 3 wherein the heat is applied by a nozzle directing a heated medium onto the selected one of the corrugations directly in advance of the roller.

8. A method as claimed in claim 3 wherein the heat is applied by a heated mechanical member pushed onto the selected one of the corrugations crests directly in advance of the roller.

9. A method as claimed in claim 3 wherein the roller is a power driven roller.

10. A method as claimed in claim 3 wherein the piece of pipe is supported on rotating supports and the piece of pipe is rotated past the roller.

11. A method as claimed in claim 10 including further rollers spaced circumferentially from one another around said piece of pipe and also applying pressure to said selected one of said corrugations crests.

12. A method as claimed in claim 11 wherein said roller and said further rollers are all connected to one another by a roller linkage system, said method comprising moving said roller and said further rollers radially with respect to the piece of pipe simultaneously and uniformly with one another by movement of a mechanical linkage system connecting said roller and said further rollers, said mechanical linkage system controlling the amount of pressure on said selected one of said corrugations crests.

13. A method as claimed in claim 2 wherein the reformed corrugation crest is subjected to cooling immediately after reforming.

14. A method as claimed in claim 13 wherein the cooling is applied by a cooling medium directed by a nozzle onto the reformed corrugation directly after the roller.

* * * * *